(12) United States Patent
Baumeier (10) Patent No.: US 7,690,717 B2
(45) Date of Patent: Apr. 6, 2010

(54) RETRACTABLE ROOF AND VEHICLE FITTED WITH SAID DEVICE

(75) Inventor: Andreas Baumeier, Bissendorf (DE)

(73) Assignee: RENAULT s.a.s., Boulogne Billancourt (FR)

( * ) Notice: Subject to any disclaimer, the term of this patent is extended or adjusted under 35 U.S.C. 154(b) by 643 days.

(21) Appl. No.: 10/546,370

(22) PCT Filed: Feb. 18, 2004

(86) PCT No.: PCT/FR2004/000374

§ 371 (c)(1),
(2), (4) Date: Oct. 26, 2006

(87) PCT Pub. No.: WO2004/075692

PCT Pub. Date: Sep. 10, 2004

(65) Prior Publication Data

US 2007/0035146 A1    Feb. 15, 2007

(30) Foreign Application Priority Data

Feb. 21, 2003    (FR) .................................. 03 02154

(51) Int. Cl.
*B60J 7/12* (2006.01)
(52) U.S. Cl. ............................ 296/136.06; 296/107.08; 296/24.44
(58) Field of Classification Search ............. 296/24.44, 296/107.08, 136.01, 136.05, 136.06, 107.01, 296/121, 107.16, 117, 37.16, 136.03
See application file for complete search history.

(56) References Cited

U.S. PATENT DOCUMENTS

| | | | | |
|---|---|---|---|---|
| 4,712,828 A * | 12/1987 | Albrecht | .................. | 296/121 |
| 5,967,593 A * | 10/1999 | Schuler et al. | ......... | 296/136.06 |
| 6,145,915 A * | 11/2000 | Queveau et al. | ........ | 296/107.08 |
| 6,315,349 B1 | 11/2001 | Kinnanen | | |
| 6,318,792 B1 * | 11/2001 | Neubrand et al. | ...... | 296/107.08 |
| 6,364,396 B1 * | 4/2002 | Hayashi et al. | ........ | 296/136.06 |
| 6,619,721 B1 * | 9/2003 | Langguth et al. | ....... | 296/136.06 |
| 6,659,534 B2 * | 12/2003 | Willard | ...................... | 296/108 |
| 6,739,443 B2 * | 5/2004 | Fernandez | ............. | 192/53.341 |
| 6,786,525 B2 * | 9/2004 | Russke et al. | .................. | 296/76 |
| 6,799,788 B2 * | 10/2004 | Plesternings | ........... | 296/107.08 |
| 6,866,327 B2 * | 3/2005 | Willard | .................. | 296/136.06 |
| 6,926,338 B2 * | 8/2005 | Spresny | .................. | 296/136.06 |
| 7,032,947 B2 * | 4/2006 | Queveau et al. | .......... | 296/24.44 |
| 7,178,852 B2 * | 2/2007 | Obendiek et al. | ...... | 296/107.17 |
| 7,237,823 B2 * | 7/2007 | Bruder et al. | .......... | 296/107.08 |
| 7,322,635 B2 * | 1/2008 | Kuttner et al. | .......... | 296/107.08 |
| 7,419,200 B2 * | 9/2008 | Queveau et al. | .......... | 296/24.44 |
| 2003/0020298 A1* | 1/2003 | Koch | ...................... | 296/107.08 |
| 2007/0222254 A1* | 9/2007 | Wagner | ...................... | 296/108 |

FOREIGN PATENT DOCUMENTS

| | | |
|---|---|---|
| DE | 44 46 483 | 6/1996 |
| EP | 0 949 105 | 10/1999 |
| EP | 1 038 710 | 9/2000 |
| EP | 1 275 543 | 1/2003 |

* cited by examiner

*Primary Examiner*—Glenn Dayoan
*Assistant Examiner*—Gregory Blankenship
(74) *Attorney, Agent, or Firm*—Oblon, Spivak, McClelland, Maier & Neustadt, L.L.P.

(57) ABSTRACT

A retractable roof for a vehicle, including a roof panel configured to be displaced by a guide from a closed position in the passenger area of the vehicle to a retracted position in a rear area of the vehicle. The roof also includes a rear cover structure including a rear shelf. The rear shelf can be automatically controlled between a rest position and an open position.

19 Claims, 7 Drawing Sheets

RETRACTABLE ROOF AND VEHICLE FITTED WITH SAID DEVICE

BACKGROUND OF THE INVENTION

I. Field of the Invention

The present invention relates to retractable-roof devices and to vehicles equipped with such devices. More particularly, it relates to retractable-roof devices capable of being stored in a part of a vehicle trunk.

II. Description of Related Art

Such structures and associated mechanisms are described and illustrated in German Patents 4445580 and 4445944. The first patent describes a rigid roof that can be retracted into part of the trunk, this roof being articulated by a quadrilateral articulation system. The second patent describes a trunk door whose mechanism permits opening toward the front for storage of luggage and opening toward the rear to permit the passage of a rigid roof.

The structures illustrated in these patents suffer from several disadvantages, such as the number of parts necessary, which adds restrictive weight and cost and which does not permit reliable repeatability of assembly. The large number of parts used in the different rod assemblies also suffers from a disadvantage in terms of system stability. In addition, these patents do not take into account the problems posed by management of the rear panel during movement of the roof structure or the problems of interaction between the vehicle body and the arms of mechanisms passing through this body.

BRIEF SUMMARY OF THE INVENTION

It is one object of the present invention to provide an improvement of these retractable-roof devices.

The invention also relates to a vehicle equipped with such a device.

BRIEF DESCRIPTION OF THE DRAWINGS

The present invention will now be described exclusively by way of example and with reference to the attached figures, wherein.

DETAILED DESCRIPTION OF THE INVENTION

Referring to these figures, a vehicle is equipped with a device for a retractable roof. In order to clarify the description hereinafter, the two extreme positions of the roof will be defined.

When the panel of roof 26 is resting on the vehicle frame, and in particular on the upper pillar of the windshield, or in other words when the roof is performing a function of covering the passenger compartment formed by the vehicle operator's station and the set of passenger seats, the roof is said to be in closed position.

When the entirety of the roof is lodged in the storage space reserved therefor in the rear 8 of the vehicle, such that the passenger compartment formed by the vehicle operator's station and the set of passenger seats is then uncovered, the roof is said to be in retracted position.

Figure 1:
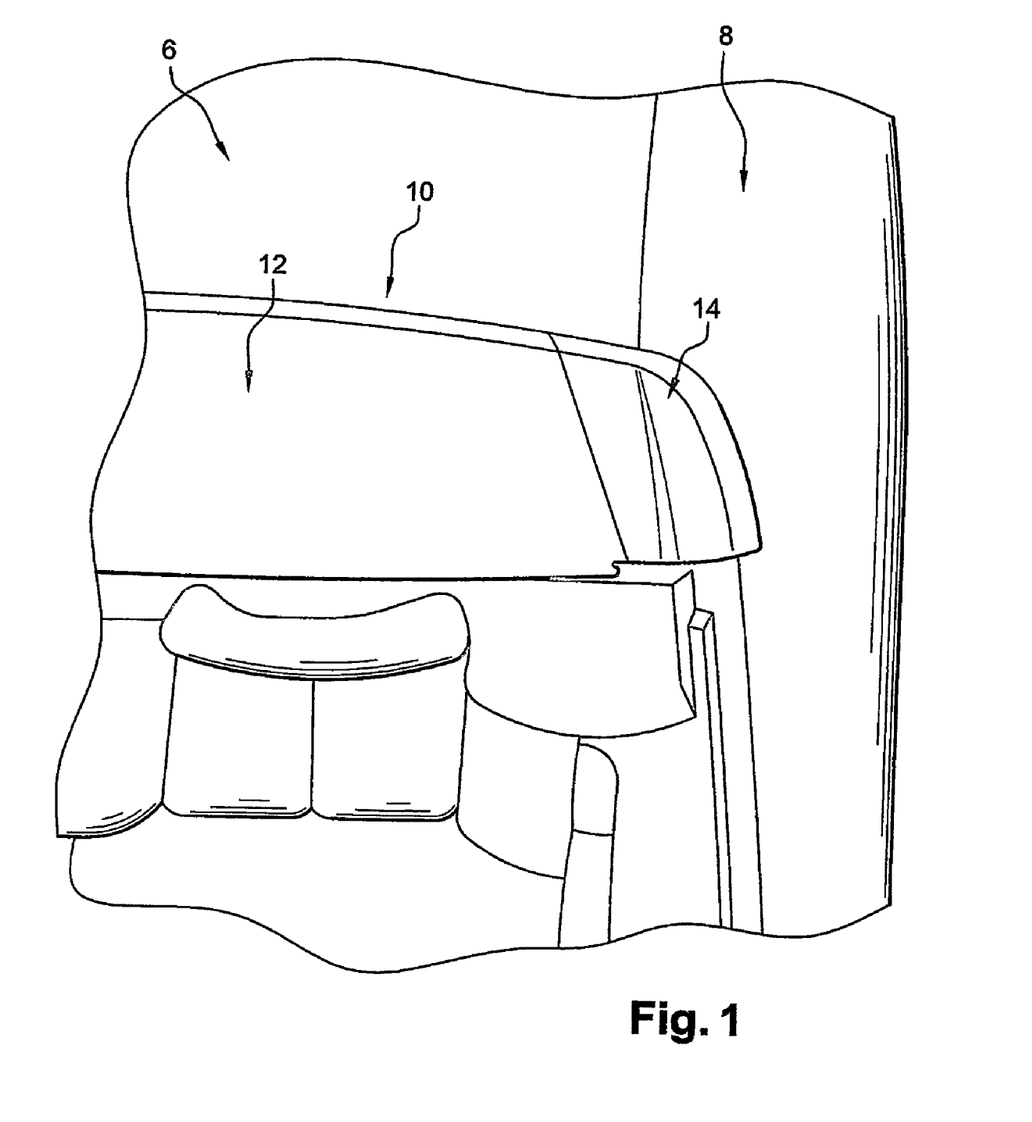
FIG. 1 is a view from above of a device of a retractable roof with a rear shelf according to the invention.
Figure 2:
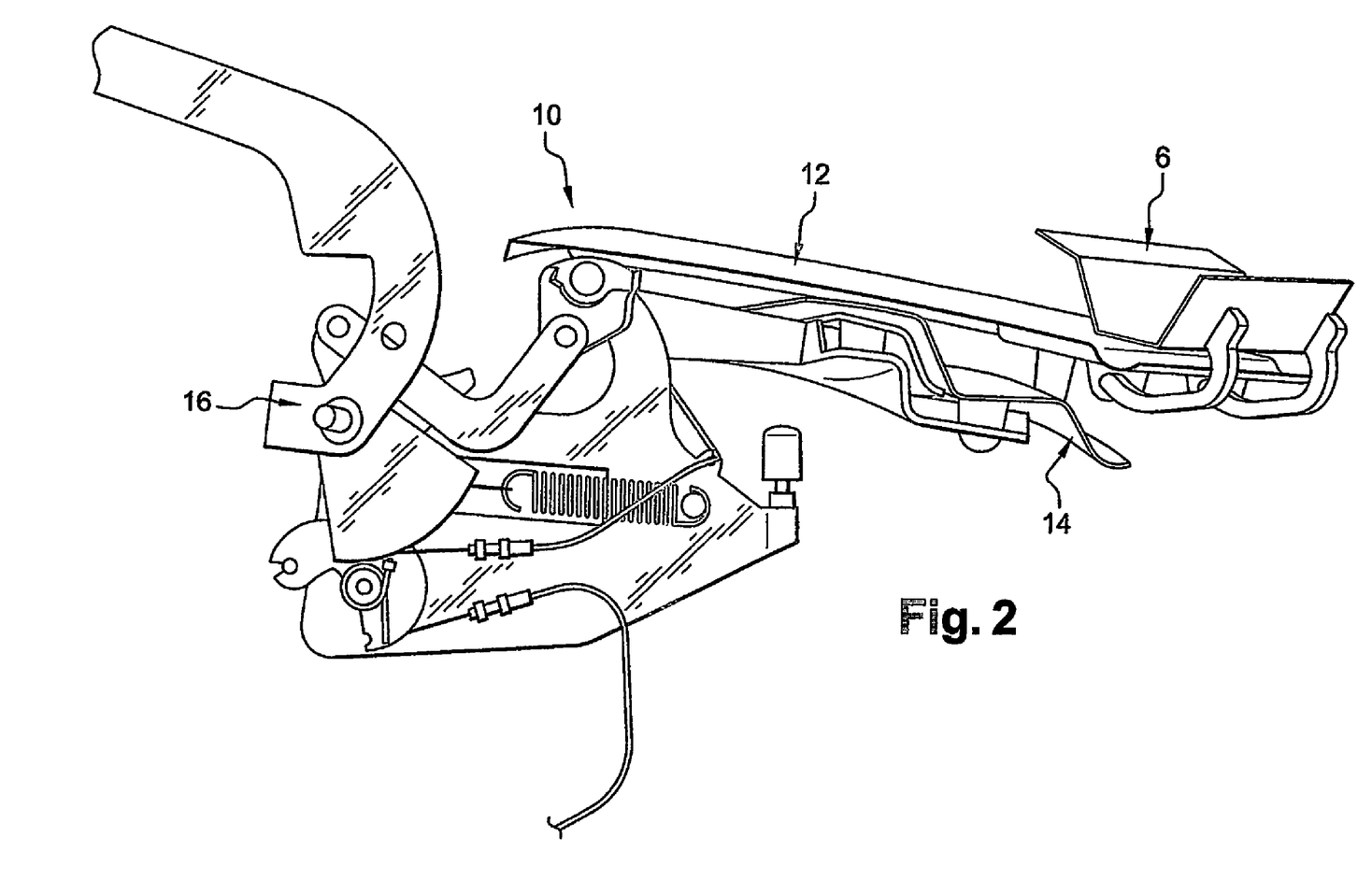
FIG. 2 is a view from the side of a shelf analogous to FIG. 1, in a rest position.
Figure 3:
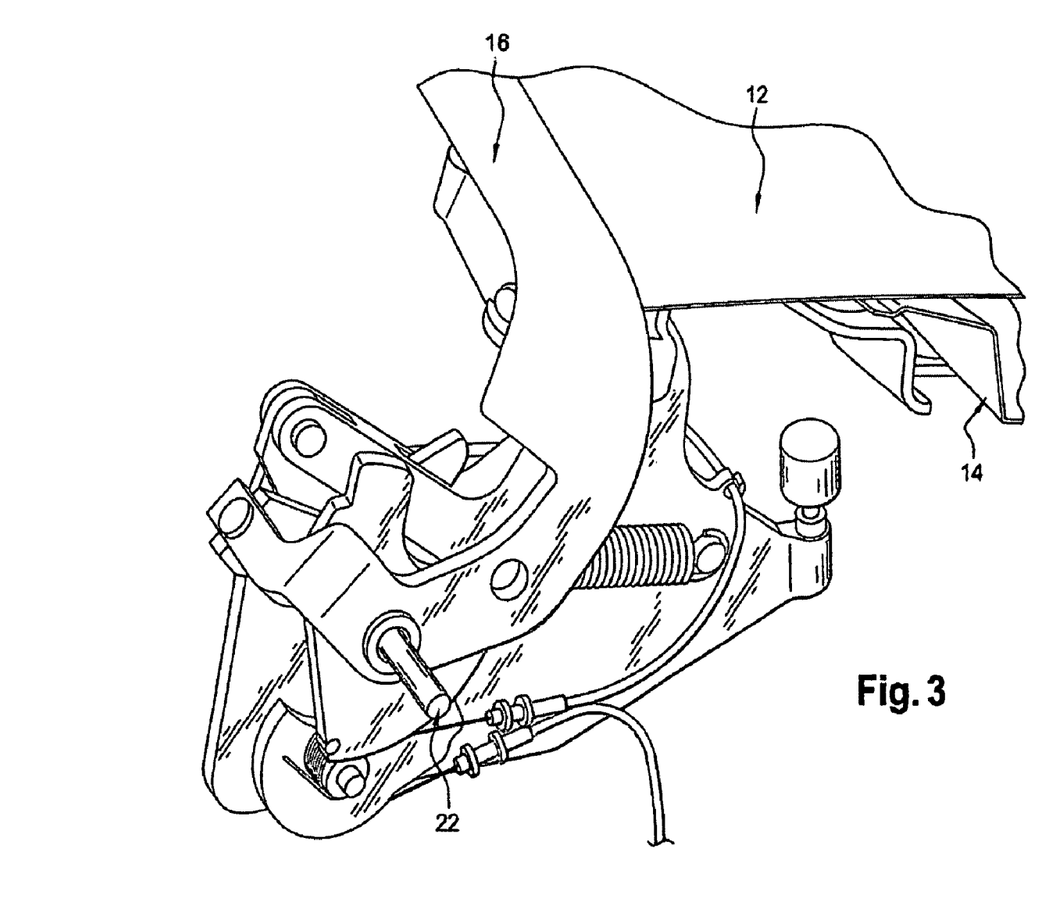
FIG. 3 is a partial view from the side of the rear shelf of FIG. 1, in rest position.
Figure 4:
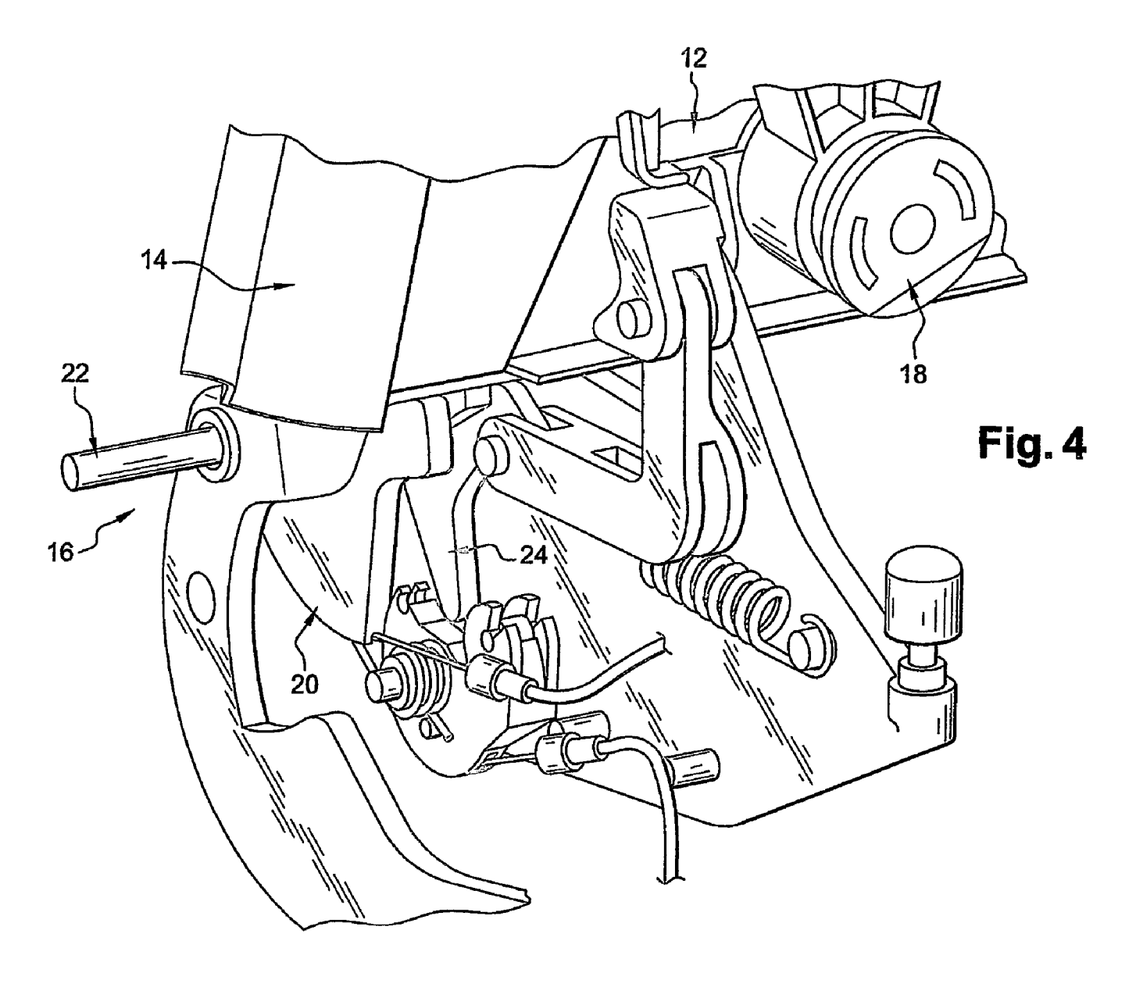
FIG. 4 is a partial view from the side of the rear shelf of FIG. 1, in open position.
Figure 5:
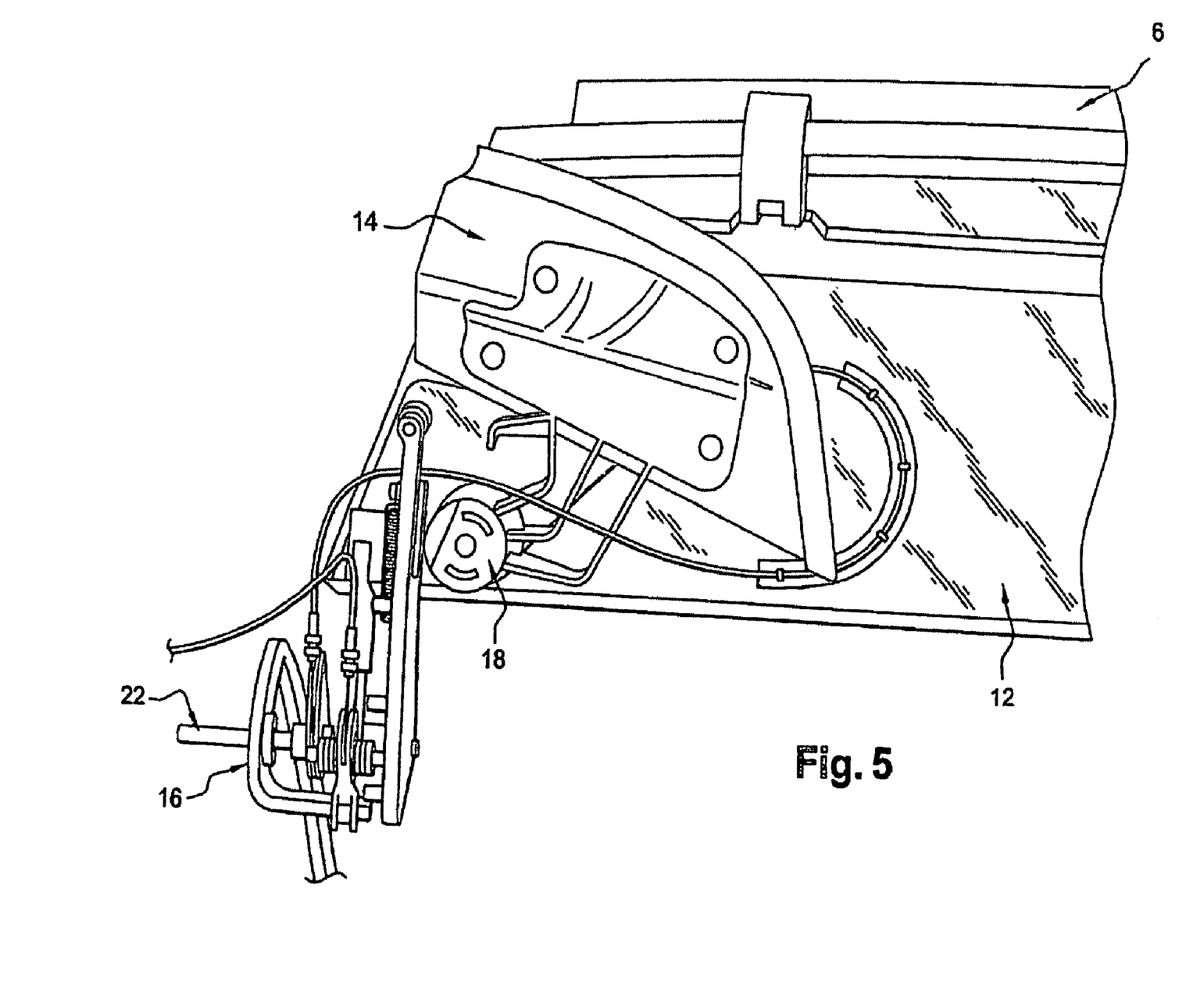
FIG. 5 is a view from below of the rear shelf according to the invention, with a closure flap in stored position.
Figure 6:
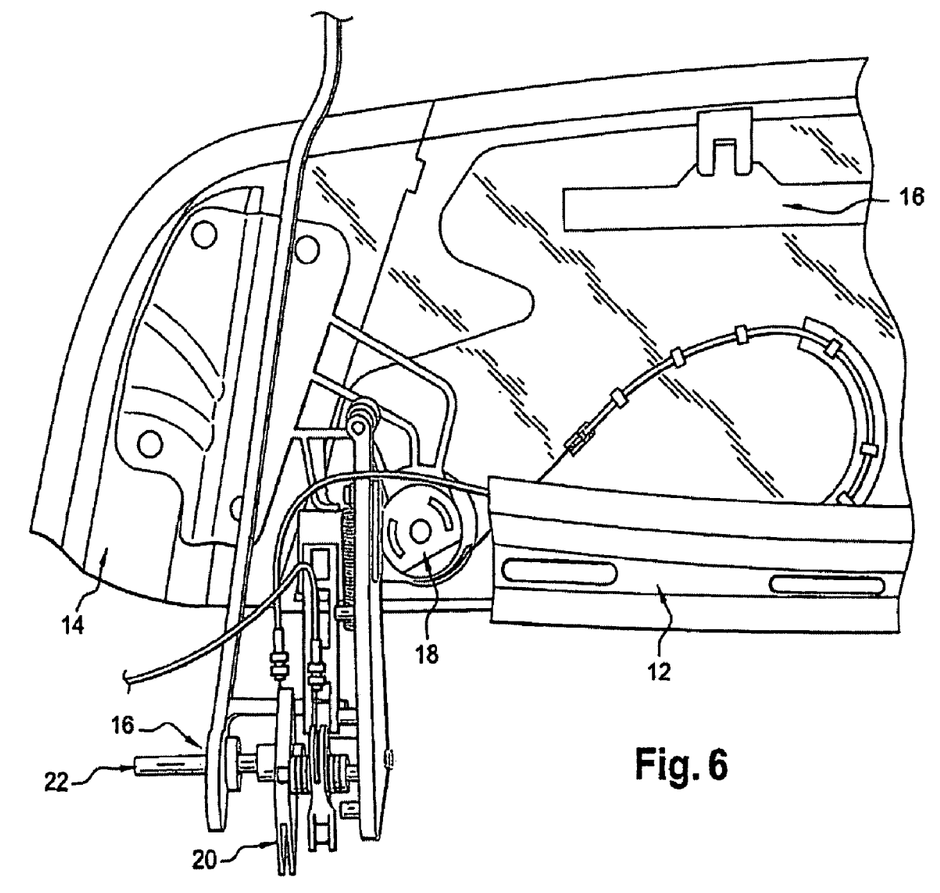
FIG. 6 is a view from below of the rear shelf according to the invention, with a closure flap in deployed position.
Figure 7:
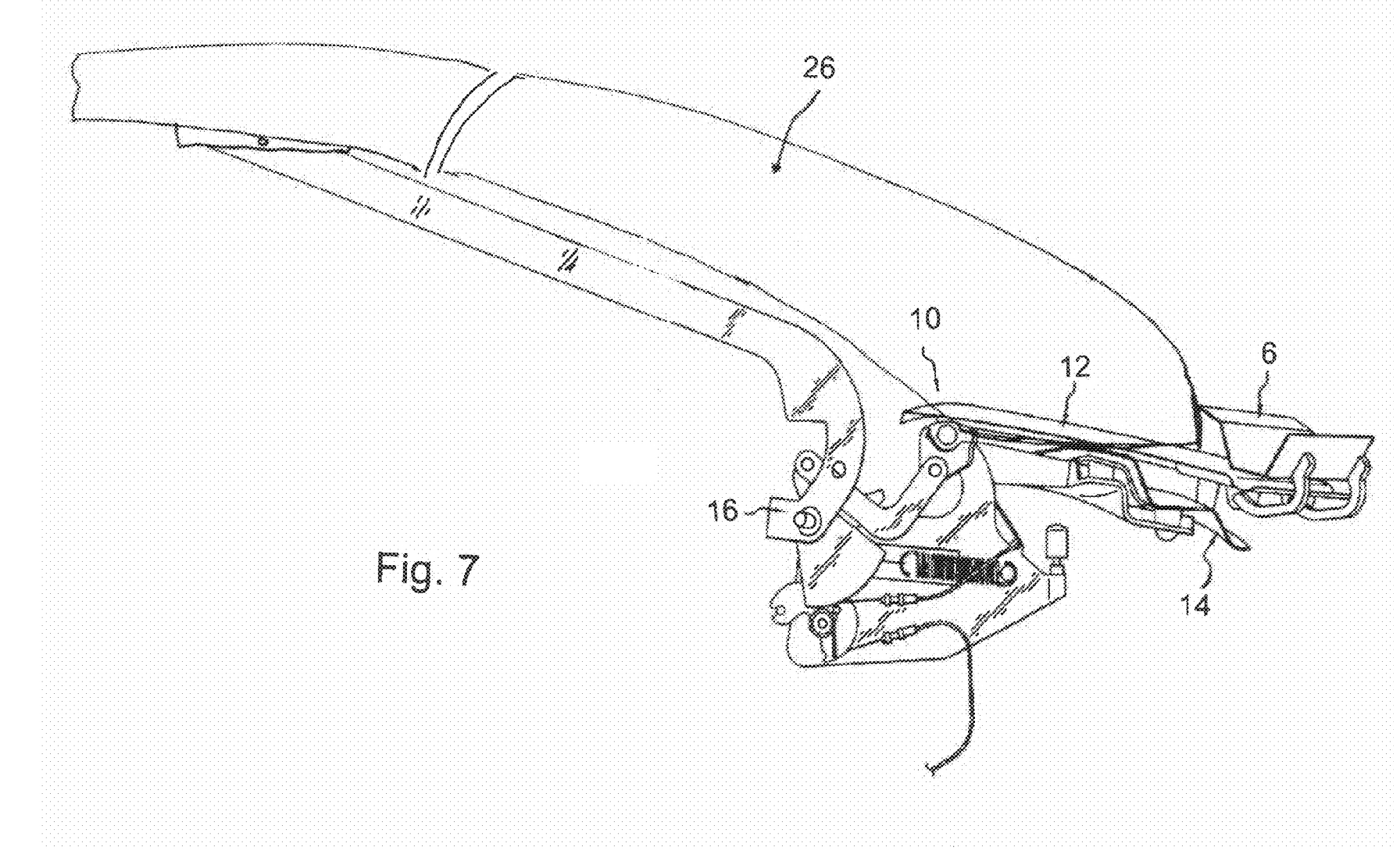
FIG. 7 is a view from the side of the shelf of FIG. 1, in a rest position, and showing a roof panel.

In a configuration with the roof in closed position, a rear cover 10 structure is situated behind the roll bars. Advantageously, it comprises a substantially horizontal rear shelf 12. On both sides of the shelf 12, transversely relative to the vehicle, arms (including interior arm 16) are deployed to support the roof, including supporting roof panel 26 as can be seen in FIG. 7. In open position, the rear shelf 12 is situated in the same substantially horizontal manner behind the roll bars. On both sides of the shelf 12, transversely relative to the vehicle, in order to conceal the space left unoccupied by the arms that are integral with the roof and that from now on are in the storage space reserved for the roof at the rear 8 of the vehicle, flaps, referred to as closure flaps 14 are displaced from a stored position to a deployed position, making it possible to conceal the unoccupied space. The presence of such flaps 14 is necessary from an esthetic viewpoint so that the vehicle in open position exhibits a continuous surface, from an aerodynamic viewpoint in order to avoid perturbations in air flow, and also to ensure sealed condition of the mechanism present under the shelf 12.

In order to permit retraction of the roof into the storage space at the rear 8 of the vehicle, the rear shelf 12 changes position and shifts successively from an initial position known as rest position, preferably substantially horizontal, to a so-called open position, preferably substantially vertical, in order to make space for the passage of the roof, before finally returning to a substantially horizontal position.

Advantageously, when the roof is in closed position or in retracted position, the rear shelf 12 is oriented at an angle to the horizontal plane, in such a way that the rear portion of the shelf 12 is lower than the front portion of the shelf 12.

The movement of the rear shelf 12 during retraction of the roof can take place in the following manner:

In closed position, the substantially horizontal shelf 12 is pinched in its rear portion by the rear portion of the roof panel 26 and the trunk lid 6, as can be seen in FIG. 7. When the vehicle operator instructs the roof to open, a control unit actuates a first movement of the trunk door to release the storage space reserved for the roof in the rear 8 portion of the vehicle. While the trunk door continues to pivot toward the rear 8 of the vehicle around a transverse shaft of the vehicle, the roof is caused to move by a hydraulic action of a control lifter. Via a system of cams 24s, the rotary movement of the roof causes a rotary movement of the shelf 12. In order to permit release of the rear shelf 12 from the pinching applied by the roof, the rear shelf 12 performs a first rotary movement toward the base of the vehicle, around a transverse shaft of the vehicle. When the rear portion of the roof that was previously pinching the shelf 12 is situated at a vertical level lower than that of the shelf 12, the shelf 12 performs a second rotary movement, this time toward the top of the vehicle, around the same transverse shaft. This second rotary movement continues until the shelf 12 becomes stopped in substantially vertical position. While the shelf 12 is in this stopped position, the roof continues to be retracted into the storage space reserved for it, from now on also causing rotation of the closure flaps 14.

The folding down of the shelf 12 then is controlled by the folding down of the trunk door. A mechanical cable, such as that used for bicycle brake cables, known by the name Bowden cable, transmits a force generated by the closing mechanism of the trunk door to a device connected to the shelf 12. When the trunk door is instructed by the control unit to fold down, or in other words while the roof has not yet been fully retracted, a simultaneous movement of the rear shelf 12 is generated by the cable link, in such a way as to cause the rear shelf 12, now inserted between the two closure flaps 14, to return to a substantially horizontal position.

The movement of the rear shelf 12 to permit the passage of the roof from a retracted position to a closed position is symmetrically identical. The shelf 12 is first brought into substantially stopped vertical position then restored to substantially horizontal position. These movements are created by the rotation of the roof as it returns to a closed position and by the action of the Bowden cable as it transmits the movements of the trunk door to the shelf 12.

As seen in the foregoing, when the roof is in retracted position, it is necessary to have closure flaps 14 on both sides of the rear shelf 12 for esthetic, aerodynamic and sealing needs. When the roof is in closed position, these same closure flaps 14 cannot be in this position, because they would cause movement of the arms associated with the roof. In closed position, these flaps 14 are therefore slipped under the rear shelf 12. The principle of movement of the flaps 14 is as follows:

The flaps 14 remain slipped under the shelf 12 when the roof is in closed position and when this roof starts to undergo a rotary movement. They remain slipped into this position until the shelf 12 becomes stopped in substantially vertical position. In this position, the rotation of the roof around a transverse shaft of the vehicle causes displacement of the flaps 14 by cam 24s. In order to shift from a position slipped under the shelf 12 to a position beside the shelf 12, while forming a plane with this shelf 12, the movement of the flaps 14 must be both a movement of release from under the shelf 12 and a translational movement to arrive at the same height as the shelf 12. Advantageously, these two movements are achieved simultaneously by a helicoidal rotation. It will be understood that these two movements can be achieved successively by a rotational movement followed by a translational movement, or by two translational movements.

The respective movements of the closure flaps 14 and of the shelf 12 are therefore generated by a common rotary mechanism based on the initial rotary movement of the roof.

A continuous rotary movement of the roof causes two successive movements, the movement of the shelf 12 first and then the movement of the closure flaps 14. By virtue of the symmetry relative to the centerline of the vehicle, the mechanism described hereinafter for the left side of the vehicle is the same for the right side.

The continuous rotary movement of the roof is generated by hydraulic control. A lifter composed of a body and piston is articulated on the body, at the end of the lifter body via which the piston emerges. Such an articulation allows movement of the lifter body without too much loss of longitudinal thrust of the piston. This piston movement generates the movement of two rods connected respectively to the free end of the piston. A first rod is integral with the body, ensuring both guidance of the movement of the piston and stability of the latter when it is extended, and a second rod, known as the leverage-reducing rod, mounted to rotate freely around the interior arm 16 of the roof, the arm supporting the roof being situated toward the passenger compartment, ensures that the translational movement of the piston can be transferred to a rotational movement of this interior arm 16. The leverage-reducing rod pulls the interior arm 16 toward the lifter when the piston is retracted and conversely pushes the interior arm 16 when the piston extends outside the lifter body. Since the lower portion of the interior arm 16 is mounted to rotate around a fixed shaft, known as principal pivot shaft 22, the displacement of the interior arm 16 is therefore a rotational movement around that shaft. The set of different pivot points formed by, among other components, this pivot shaft, the pivot points between the structure of the roof and the upper portions of the interior and exterior arms, and a pivot point between the lower portion of the exterior arm and the body form an articulated quadrilateral, whose movement is generated by rotation of the interior arm 16 around the principal pivot shaft 22. The mobility of the roof, supported by the articulated quadrilateral, is therefore created by the substantially longitudinal movement of the piston and is effected via a rotation of the principal shaft 22.

This principal pivot shaft 22 also carries at least one first pulley 20 having a flange perpendicular to the pivot shaft and a groove around the periphery of the first pulley 20. The principal pivot shaft 22 also carries at least one cam 24 having a radial protuberance. At its end, the interior arm 16 extends toward the interior of the vehicle, this extension being parallel to the principal pivot shaft 22. The relative position of the different elements carried by the principal pivot shaft 22 is such that the interior arm 16 is situated toward the exterior of the vehicle, the cam 24 is situated toward the interior of the vehicle and the first pulley 20 is situated between the arm 16 and the cam 24. The extension of the interior arm 16 parallel to the principal pivot shaft 22 therefore intersects the plane of rotation of the first pulley 20 and the radial flange of the first pulley 20 has a dimension such that it can be in contact with the extension of the interior arm 16 parallel to the principal pivot shaft 22.

A substantially L-shaped lever is articulated at one of its ends on the cam 24 and has an orifice for passage of the radial protuberance of the cam 24 in an extreme position. The other end of the lever is mounted to rotate around a shaft integral with the shelf 12.

A second pulley is mounted to rotate around a second pivot shaft 22 carried by a housing, which also carries the principle pivot shaft 22. This second pulley has a groove in which a mechanical cable of the bicycle-brake type is inserted. This cable is connected to the opening mechanism of the trunk door.

The cam 24 is connected to one end of a restoring spring, whose other end is integral with the housing. This restoring spring tends to return the shelf 12, via the cam 24 and the L-shaped lever, to a substantially horizontal position when the second pulley, which blocks the radial protuberance of the cam 24, is actuated by the cable of the trunk door. The cam 24 is then released and returns into contact with the extension of the interior arm 16 because of the action of the restoring spring.

The extension of the interior arm 16 has a first and a second surface capable of cooperating simultaneously with a third surface of the flange of the first pulley 20 and with a fourth surface of the cam 24. These third and fourth surfaces are arranged so that, in a rest position when the shelf 12 is lowered and the roof is closed, they are not located in a plane parallel to the plane defined by the first and second surfaces of the extension of the interior arm 16. The cam 24 is therefore offset in rest position relative to the first pulley 20, in such a way that, during retraction of the roof and therefore rotation of the interior arm 16 the second surface of the extension of the interior arm 16 first comes into contact with the fourth surface of the cam 24 and at first creates rotation of the cam 24 around the principal pivot shaft 22. The rotation of this cam 24 causes on the one hand displacement of the L-shaped lever and therefore of the shelf 12 into a vertical position, and on the other hand the displacement of the radial protuberance of the cam 24, which then becomes engaged in a slot of the second pulley.

While retraction of the roof is continuing, or in other words while rotation of the interior arm 16 around the principal pivot shaft 22 is continuing, the first surface of the extension of the interior arm 16 now comes into contact with the third surface of the first pulley 20 and creates a rotation of the first pulley 20 around the principal pivot shaft 22. A cable of the bicycle-brake type is fixed in the groove of this first pulley 20, and the rotation of this first pulley 20 generates a tractive force on this cable; at the other end of the cable, this tractive force acts on an actuating mechanism 18 of the closure flaps 14. This actuating mechanism 18 of the closure flaps 14 is fixed to the shelf 12 and consists of a shaft integral with the shelf 12 and a cylinder carrying the closure flap 14. The movement of the cylinder relative to the shaft is a helicoidal rotary movement, which permits release of the flap 14 from underneath the shelf 12 and at the same time allows the flap 14 to be restored to a substantially equivalent vertical level. The helicoidal rotary movement of the closure flaps 14 is therefore initiated by the rotation of the first pulley 20 carried by the principal pivot shaft 22.

It will be understood that the movement of the closure flaps 14 begins during retraction of the roof, while the shelf 12 is substantially in vertical position. This movement of the flaps 14 is ended when the roof is already retracted and the trunk door resumes its initial position. The assembly formed by the first pulley 20, the intermediate support and the cam 24 being stopped against the extension of the interior arm 16 the return of the rear shelf 12 to position is initiated by the start of movement of the trunk door. A cable connects the mechanism of this trunk door to the second pulley and permits release of the radial protuberance of the cam 24, by creating a rotary movement of the second pulley. The movement that is now permitted of the cam 24 and therefore of the L-shaped lever allows the shelf 12 to be returned to substantially horizontal position. This substantially horizontal position is kept stopped by the contact of the shelf 12 on a pin integral with the housing.

When the vehicle operator instructs the roof to close, the operation takes place symmetrically in the same manner. The opening of the trunk door and the start of movement of the articulated assembly supporting the roof cause the rear shelf 12 to become shifted into a substantially vertical position and cause the stops represented by the first and second surfaces of the extension of the interior arm 16 on the third surface of the first pulley 20 and fourth surface of the cam 24 to be released. A spring system placed between the shaft and the cylinder used for the helicoidal rotation of the closure flaps 14 then permits, when the pressure exerted by the cable on the cylinder no longer exists, or in other words when the first pulley 20 is released following rotation of the principal shaft 22, the flaps 14 to be returned to position under the shelf 12 in order to permit passage of the arms supporting the structure of the roof.

The closed position of the roof, in which the articulated assembly supporting the roof has a lower portion underneath the structure of the body and an upper portion connected to the roof and therefore above this structure of the body, and the retracted position of this roof in which the articulated assembly is entirely situated underneath the structure of the body, entails the creation of an orifice in the structure of the body to permit passage of the articulated assembly. These orifices cannot be uncovered when the roof is in retracted position, for esthetic, aerodynamic and sealing reasons. Advantageously, the interior arm 16 supporting the roof has an elbowed shape close to its lower end. This elbowed shape is complementary to a cam 24, belonging to a trap door, not illustrated, situated in the structure of the vehicle, in a zone substantially close to the shelf 12. When the roof is activated in order to return to closed position, the lower portion of the interior arm 16 once again comes into contact with the cam 24 of the trap door and creates a rotation of this cam 24 and of an associated plate and therefore causes the trap door to open. The interior arm 16 and the exterior arm can then pass through this trap door in order to support the roof. A restoring spring is connected to the cam 24 of the trap door, in such a way that, during retraction of the roof, and therefore when the lower portion of interior arm 16 is no longer in contact with the cam 24, this cam 24 resumes its rest position and causes the trap door to shut via return of the plate associated with the cam 24 to its rest position.

The present invention also relates to a mechanism of the trunk door. A vehicle whose rigid roof can be retracted into a storage space reserved in the rear 8 of the vehicle must be equipped with a trunk door having special kinematics.

Firstly, the trunk door must permit standard opening, in order to store luggage in the trunk. For this purpose, the trunk door is mounted to rotate around a transverse shaft in the portion of the trunk door situated farthest forward in the vehicle, when this trunk door is in closed position: access to the trunk then takes place, when the trunk door is open, via the rear 8 of the vehicle.

Secondly, when the vehicle operator demands retraction of the roof, the roof becomes stored in a storage space reserved therefor in the zone of the trunk. The trunk door must therefore be opened to allow the roof to pass, and a standard opening maneuver does not permit this. The trunk door must then pivot around a second transverse pivot shaft in the portion of the trunk situated farthest to the rear in the vehicle, when this trunk door is in closed position: access to the trunk then takes place, when the trunk door is open, via the front of the vehicle and therefore permits passage of the roof and its associated mechanism.

The trunk door is caused to move by an assembly of three principal elements, namely a locking device comprising a hinge of "gooseneck" type and two lateral mechanisms disposed symmetrically on each side of the trunk door. Only the lateral mechanism of the left side of the vehicle will be described, since the lateral mechanism corresponding to the right side is symmetrically equivalent thereto.

This lateral mechanism is composed of a mounting plate integral with the body, of an intermediate chassis articulated on this mounting plate, of a first pneumatic system, one end of which is fixed on the mounting plate and the other end of which is connected to the intermediate chassis, and of an articulation system situated between the intermediate chassis and the trunk door and formed by rods and a second pneumatic system. The mounting plate makes it possible to combine, in the same part, different functionalities, such as articulation of the intermediate chassis, immobilizing means offering the possibility of locking this chassis in ready-to-mount position, the fixation of the first pneumatic system actuating the movement of the intermediate chassis. This mounting plate is made of relatively lightweight material, has small thickness and can advantageously be of triangular shape.

The intermediate chassis itself is made in one piece, having substantially "double-L" shape. A first portion, known as the articulation portion, is mounted on the mounting plate by a pivot joint around a shaft substantially transverse relative to the vehicle and perpendicular to the plane of the mounting plate. This first articulation portion also carries the free end of the first pneumatic system, the translational movement of the piston generating, via this freely pivotal joint and the point of articulation of the chassis on the mounting plate, a rotary movement of the intermediate chassis around a shaft transverse relative to the vehicle and perpendicular to the plane of the mounting plate. The intermediate chassis has a first elbowed portion that connects the first articulation portion to a second portion, known as the transfer portion. This second transfer portion and the first articulation portion are substantially at right angles. At the other end of the second transfer portion, a second elbowed portion is prolonged by a third portion, known as the support portion, substantially parallel to the first articulation portion. This third support portion has different articulation points, on which there are fixed the different rods of the articulation system, which system is situated between the third support portion of the intermediate chassis and a support plate integral with the trunk door. The free end of the piston of the second pneumatic system is also fixed on the third support portion of the chassis, the body of the lifter of the second pneumatic system being connected to the support plate integral with the trunk door.

During opening of the trunk door in the traditional manner for the purpose of storing luggage, the piston of the second pneumatic system, compressed when the trunk door is closed, extends as soon as the lock of the trunk door is unlocked. The extension of this piston then creates opening of the trunk door, accompanied by the rods of the articulation system connected to the third support portion of the intermediate chassis. In such an opening, the intermediate chassis does not shift and remains fixed relative to the mounting plate because of the action of immobilizing means mounted on this mounting plate. A pin mounted on the chassis, for example at the second curved portion, may have for this purpose a shape complementary to a system of hooks of immobilizing means. In this position, known as the rest position, the arrangement of the assembly formed by the mounting plate and the chassis is such that advantageously the first articulation portion and the third support portion of the intermediate chassis are substantially oriented horizontally and the second transfer portion is substantially oriented vertically. In order to ensure that the chassis catches in the lock in order to return to a rest position, a pulley can be fixed on the intermediate chassis and be used as guide by virtue of the fact that it is complementary relative to a groove made on the mounting plate. Advantageously, this pulley/groove assembly is constructed at those ends of the mounting plate and of the chassis that are remote from their common articulation point.

The chassis must catch securely on the mounting plate in order to ensure that the opening of the trunk door for storage of luggage takes place via an articulation based on a substantially horizontal and rigid structure. It is also favorable for the manufacturer during assembly of the vehicle, because the assembly formed by the mounting plate and the chassis caught in the lock can in this way be supplied ready to mount without exhibiting any dispersion as regards installation on each vehicle. The repeatability that such a system exhibits then offers time savings and installation quality that are favorable for the manufacturers.

During the opening of the trunk by rotation of the trunk door around the second transverse pivot shaft in the portion of the trunk door situated farthest to the rear of the vehicle, or in other words during the opening of the trunk door to permit retraction of the roof, the intermediate chassis is released from the lock of the mounting plate. The first pneumatic system is fixed on the mounting plate, advantageously in the lower part of this mounting plate, the free end of the piston being connected to the intermediate chassis as described in the foregoing. The piston of the first pneumatic system, compressed when the intermediate chassis is in a rest position, extends as soon as the lock of the mounting plate no longer retains the pin of the intermediate chassis. The extension of this piston, then its actuation by hydraulic pressure, then creates rotation of the intermediate chassis around a pivot shaft perpendicular to the mounting plate and therefore substantially parallel to the transverse second pivot shaft. In this configuration, the actuation of the second pneumatic system, situated between the third support portion of the chassis and the support plate integral with the trunk door, is such that the second pneumatic system remains compressed. The rods of the articulation system situated between the third support portion of the intermediate chassis and the support plate integral with the trunk door remain at rest and do not articulate in this case. The system transmits the rotary movement of the intermediate chassis to the trunk door, which undergoes a rotary movement around a transverse shaft belonging to the trunk door and different from the intermediate chassis.

This rotary movement is performed around a transverse shaft, which advantageously passes through the lock of the trunk door. This lock therefore has a special structure in order to take into account the opening of the trunk around this second transverse pivot shaft passing through the lock and to avoid generating force in the lock, which would be the case with a traditional lock and a trunk door that shifts while remaining caught. This lock is based on a structure formed advantageously from two parts, a fixed casing integral with the structure of the body of the vehicle and a hinge of gooseneck type, which travels in a slide of the casing. The curved shape of the slide and the corresponding shape of the hinge generate a movement of this hinge equivalent to a rotary movement around a transverse shaft that can be assimilated with the second transverse pivot shaft around which the trunk door rotates. The upper part of the gooseneck hinge carries the catch and bolt of the lock, which will correspond to a zone arranged in the lower portion of the trunk door. By virtue of the curved connection between the casing and the hinge, the two elements of the lock carried both by the body and the trunk door can be inclined in coordinated manner. The movement of the gooseneck hinge corresponds to the movement of the trunk door in smaller proportions. This combination of movements permits a rotary movement of the trunk door without generating force on the lock in contact with this trunk door.

The opening of the trunk door for retraction of the roof is therefore based among other factors on two lateral systems and one lock system provided with a gooseneck hinge, which systems are independent. In each of the lateral systems, the intermediate chassis is formed in one piece, which provides savings of parts and therefore of weight and money, and better stability of each lateral system. Synchronization of the movements of the two lateral systems is achieved by transmission of a control signal equivalent to a pressure to the first pneumatic systems. Such synchronization thus makes it possible to operate without a mechanical appendage connecting the two lateral systems. It is to be noted that the trunk door may advantageously have a flexibility that is predetermined to be adapted to the movements of the independent lateral systems.

Installation of the mechanisms of the roof and the trunk door on the vehicle can be achieved as follows. The substructure of a vehicle, or in other words the totality of the structures of the body of the vehicle other than opening members and roof, arrives on an assembly line. A first assembly formed among other components by the mounting plate and the intermediate chassis, which is clipped onto the mounting plate, is installed on the side faces inside the trunk zone. This assembly also contains the second pneumatic system and the articulation system formed by rods, as well as the support plate intended to be made integral with the trunk door. The whole is delivered to the assembly line together with the mounting plate and chassis clipped together, with the articulation system folded up and the second pneumatic system connected at its lifter body to the support plate and clipped at the end of its piston also to the support plate. This piston end is intended to be fixed to the third support portion of the intermediate chassis at the end of installation. At first it is clipped onto the support plate to facilitate manipulation by the operator, after which it is unclipped and positioned on the chassis as soon as the lateral opening members are installed. It is to be noted that the fact that the assembly comprising mounting plate and chassis arrives clipped together on the assembly line makes it possible to fix the assembly without dispersion between one installation and another. The support plate is then made integral with the trunk door when this arrives on the assembly line. The mechanism of the trunk door is then almost installed. Only the first pneumatic system, which must be installed between the first articulation portion of the chassis and the mounting plate, is missing. This first pneumatic system is delivered to the assembly line with the roof. In fact, the roof is delivered to the assembly line with at least the hydraulic distribution box, the left and right first hydraulic systems, the shelf 12, the closure flaps 14 and the mechanism associated with this shelf 12 and these flaps 14. The fact that a hydraulic assembly is delivered in this way as a unit permits the operator to achieve easier installation of the hydraulic cables. Once the roof is in place, all that is left for the operator is to fix the hydraulic distribution box in the trunk and to connect it to a control unit, so that the hydraulic pressure control signals necessary to bring about movement of the mechanisms of the roof and of the trunk can be transmitted from the control unit to the pneumatic systems. The operator must also fix the first pneumatic system between the chassis and the mounting plate, by fixing the lifter body on the mounting plate, advantageously in the lower portion of this mounting plate, and by installing the free end of the piston to rotate on the first articulation portion of the chassis. By means of a cable of the bicycle-brake type, the operator must also connect the mechanism of the trunk door and the mechanism of the shelf 12 delivered with the roof. Synchronized actuation of the opening movements of the roof and of the trunk door is ensured among other features by this connection.

TABLE OF REFERENCES ACCORDING TO FIGS. 1 TO 6

6 Trunk lid
8 Rear zone of the vehicle
10 Rear cover structure
12 Rear shelf
14 Closure flaps
16 Interior Arm
18 Actuating mechanism of the closure flaps
20 First pulley
22 Principal pivot shaft
24 Cam
26 Roof panel

The invention claimed is:

1. A device for a retractable roof for a vehicle, comprising:
a roof panel configured to be shifted by a guide from a closed position in a zone of passengers of the vehicle to a retracted position in a rear zone of the vehicle, wherein the guide includes at least one arm;
a rear cover structure, including a rear shelf, wherein the rear shelf is configured to be actuated automatically via a mechanism between a rest position and an open position; and
a pivot shaft attached to the at least one arm and the mechanism, wherein the at least one arm and the mechanism pivot around the pivot shaft.

2. A device according to claim 1, wherein the rear shelf is configured to be actuated toward the open position during movement of the roof panel toward the retracted position.

3. A device according to claim 1, wherein the rear shelf is configured to be actuated toward the open position during movement of the roof panel from the retracted position toward the closed position.

4. A device according to claim 1, wherein the rear shelf is configured to be actuated from the open position toward the rest position during movement of the roof panel from the retracted position or toward the retracted position.

5. A device according to claim 1, wherein the rear shelf is actuated with a rotary movement of the mechanism around the pivot shaft.

6. A device according to claim 1, wherein the rear shelf is connected to a portion of the roof and, during retraction of the roof, the rear shelf is configured to become detached from the portion of the roof by a first movement and is configured to be shifted to the open position by a second movement.

7. A device according to claim 6, wherein the first and second movements have directions that are substantially opposite to one another.

8. A device according to claim 7, wherein the first and second movements are rotary movements around a traverse shaft that is substantially transverse.

9. A device according to claim 1, further comprising closure flaps that extend toward an exterior of lateral portions of the rear shelf, and which are mounted to rotate on the rear shelf and which are configured to pivot during movement of the roof panel.

10. A device according to claim 9, wherein the closure flaps pivot toward an interior of the vehicle during movement of the roof panel.

11. A device according to claim 9, wherein the roof panel is retracted under a trunk door of the vehicle, the trunk door being caused to move toward an open position during movement of the roof panel, and movement of the closure flaps is actuated by a kinematic operation generated by the movement of the trunk door.

12. A device according to claim 9, wherein the closure flaps are positioned beneath the rear shelf when the roof panel is in the closed position.

13. A device for a retractable roof for a vehicle, comprising:
a roof panel configured to be shifted by a guide from a closed position in a zone of passengers of the vehicle to a retracted position in a rear zone of the vehicle; and
a rear cover structure, including a rear shelf, wherein the rear shelf is configured to be actuated automatically between a rest position and an open position,
wherein the roof panel is retracted under a trunk door of the vehicle, the trunk door being caused to move toward an open position during movement of the roof panel, and movement of the rear shelf is actuated by a kinematic operation generated by the movement of the trunk door.

14. A vehicle, comprising:
a roof device, comprising:
a roof panel configured to be shifted by a guide from a closed position in a zone of passengers of the vehicle to a retracted position in a rear zone of the vehicle, wherein the guide includes at least one arm, a rear cover structure, including a rear shelf, wherein the rear shelf is configured to be actuated automatically via a mechanism between a rest position and an open position, and a pivot shaft attached to the at least one arm and the mechanism, wherein the at least one arm and the mechanism pivot around the pivot shaft; and a motive power source for actuating the mechanism.

15. A vehicle according to claim 14, wherein the motive power source comprises an actuating mechanism shared with the guide.

16. A vehicle according to claim 15, wherein the actuating mechanism comprises a hydraulic device.

17. A vehicle according to claim 14, wherein the roof panel is retracted under a trunk door of the vehicle, the trunk door being caused to move toward an open position during movement of the roof panel, and movement of the rear shelf is actuated by a kinematic operation generated by the movement of the trunk door.

18. A vehicle according to claim 14, further comprising closure flaps that extend toward an exterior of lateral portions of the rear shelf, and which are mounted to rotate on the rear shelf and which are configured to pivot during movement of the roof panel, wherein the roof panel is retracted under a trunk door of the vehicle, the trunk door being caused to move toward an open position during movement of the roof panel, and movement of the closure flaps is actuated by a kinematic operation generated by the movement of the trunk door.

19. A vehicle according to claim 18, wherein the closure flaps are positioned beneath the rear shelf when the roof panel is in the closed position.

* * * * *